United States Patent [19]
Brooks et al.

[11] 3,770,082
[45] Nov. 6, 1973

[54] DISC BRAKE CALIPER ASSEMBLY
[75] Inventors: Frank W. Brooks, Dayton; John G. Sebring, Arcanum, both of Ohio
[73] Assignee: General Motors Corporation, Detroit, Mich.
[22] Filed: Nov. 29, 1972
[21] Appl. No.: 310,351

[52] U.S. Cl. ......... 188/71.9, 188/106 F, 188/196 D
[51] Int. Cl. ............................................. F16d 65/56
[58] Field of Search ............. 188/71.8, 71.9, 106 F, 188/106 P, 196 D, 196 BA, 72.6

[56] References Cited
UNITED STATES PATENTS
3,633,712   1/1972   Farr ................................ 188/71.9
3,653,470   4/1972   Travis ............................. 188/71.9
3,688,875   9/1972   De Hoff .......................... 188/71.9

*Primary Examiner*—Duane A. Reger
*Attorney*—W. S. Pettigrew et al.

[57] ABSTRACT

A disc brake caliper assembly having a hydraulic actuating cylinder incorporating two separate hydraulic chambers, a manually acutated parking brake mechanism, and a brake adjuster.

3 Claims, 2 Drawing Figures

PATENTED NOV 6 1973

3,770,082

DISC BRAKE CALIPER ASSEMBLY

The invention relates to a disc brake caliper construction in which two separate hydraulic chambers are provided in the cylinder to which two separate brake system hydraulic circuits are connected. When installed in a vehicle, the separate brake circuits may be arranged in relation to the front and rear brake units in any of several configurations. A typical configuration would involve the use of brake calipers having separate hydraulic chambers on the front brakes and single chambered brakes for the rear wheels. One brake circuit may be connected to one chamber of each of the front brakes and another brake circuit to the other chamber of each of the front brakes. Each circuit may be connected to one of the rear brakes, or one circuit may be connected to both rear brakes. If brake calipers having separate hydraulic chambers are also provided for the rear wheels, two brake circuits may be connected to them in the same manner that they are connected to the front brakes. The brake calipers embodying the invention also provide for manually actuated braking as well as brake adjustment.

IN THE DRAWING

Figure 1:
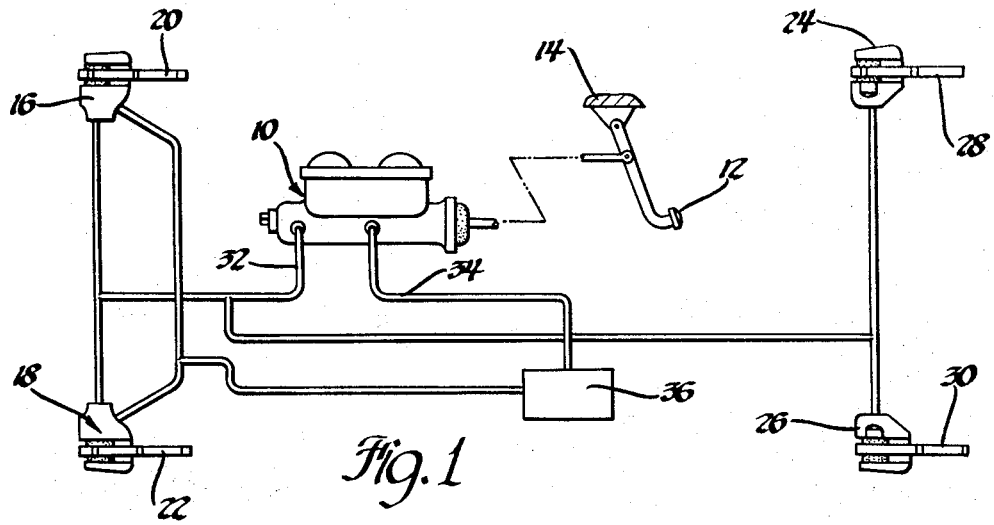
FIG. 1 is a schematic representation of a vehicle wheel brake system having brake caliper assemblies embodying the invention used therein for braking the front wheels.

The system shown in FIG. 1 includes a dual chamber master cylinder assembly 10 suitably mounted to be actuated by the brake pedal 12 which is pivotally attached to a portion 14 of the vehicle. The front brake caliper assemblies 16 and 18 are mounted to provide braking force acting on the front brake discs 20 and 22, respectively. The rear brake assemblies 24 and 26 are illustrated as including disc brake calipers which respectively exert braking force on the rear brake discs 28 and 30. The brake line 32, communicating with pressurizing chamber of the master cylinder 10, is connected to one chamber of each of the front brake caliper assemblies 16 and 18 and is also connected to the rear brake assemblies 24 and 26. The brake line 34 connects the other pressurized chamber of the master cylinder with the other set of hydraulic chambers in the front brake caliper assemblies 16 and 18. A vacuum or hydraulic booster valve 36 may be provided in brake line 34 intermediate the master cylinder and the front brake caliper assemblies. In this schematically disclosed arrangement, the rear brake assemblies 24 and 26 could be another type of brake assembly such as a drum brake arrangement with attendant metering and proportioning valves as necessary to provide smooth system operation. In some arrangements brake line 32 could be connected with rear brake assembly 24, for example, while brake line 34 could be connected with rear brake assembly 26. Should dual chambered disc brake assemblies be used as a part of the rear brakes, brake line 32 would then be connected to one of the chambers in each of the rear brake assemblies and brake line 34 would be connected to the other chamber in each of the rear brake assemblies. All such arrangements have the advantage of improving partial system brake effectiveness.

Figure 2:
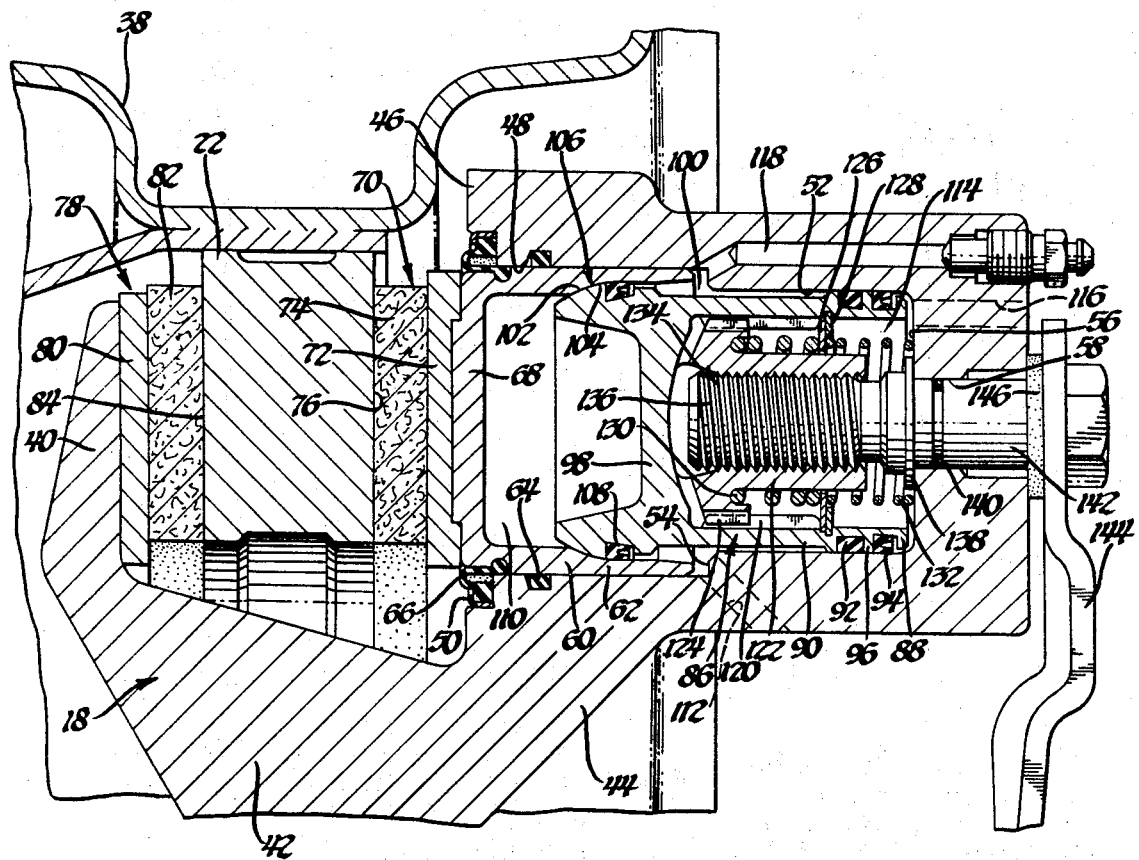
FIG. 2 is a cross-section view with parts broken away of one of the front wheel brake caliper assemblies of FIG. 1.

One of the front disc brake caliper assemblies is illustrated in greater detail in FIG. 2 and for simplicity is considered to be caliper assembly 18. The left front wheel 38 has disc 22 suitably slidably mounted thereon so that the disc slides axially to accommodate brake lining wear. This is necessary since the particular caliper assembly illustrated is of the fixed caliper type. The caliper assembly frame includes an outer leg 40 joined by a bridging section 42 to the inner leg 44. The caliper housing 46 is integrally formed with the inner leg 44 to provide a disc wheel cylinder defined by a first cylinder wall 48 adjacent the caliper housing opening 50, which faces disc 22, and a second cylinder wall 52 stepped inwardly of cylinder wall 48 and of somewhat smaller diameter than that cylinder wall. Shoulder 54 is provided to join the two cylinder walls. The bottom of the cylinder is defined by an end wall 56 which has an axially extending aperture 58 communicating with the wheel cylinder and the exterior of the housing. An outer piston 60 is generally cup-shaped so that the outer surface of the piston skirt 62 mates with the first cylinder wall in reciprocal relation. A suitable seal 64 and a boot 66 are provided to protect the outer piston and cylinder wall 48 and to seal hydraulic pressure within the brake cylinder. Seal 64 is arranged to retract the outer piston 60 upon brake release as well as to seal the outer piston relative to the cylinder side wall 48. The outer piston 60 has a head 68 on which is mounted the brake pad assembly 70, which consists of a backing plate 72 and brake lining 74. The brake lining is positioned to engage the friction braking surface 76 of disc 22.

Another brake pad assembly 78, consisting of a backing plate 80 and brake lining 82, is mounted on the caliper outer leg 40 so that lining 82 is engageable in braking relation with the friction braking surface 84 of disc 22. It can be seen that when brake pad assembly 70 is forced into braking relation with disc 22, the disc will slide as necessary to engage brake pad assembly 78 so that the caliper grips the disc in braking relation.

An inner piston 86 is reciprocably received within the brake wheel cylinder in such a manner that the open end 88 of its piston skirt 90 fits reciprocably relative to cylinder wall 52 and is provided with suitable seals 92 and 94. The portion of skirt end 88 containing seals 92 and 94 is preferably formed as a land 96 so that the portion of the piston skirt 90 between land 96 and the head 98 of inner piston 86 is spaced radially inwardly of cylinder wall 52. Therefore, an outer pressure chamber 100 is defined by pistons 60 and 86, cylinder walls 48 and 52 and shoulder 54.

Inner piston head 98 extends into outer piston skirt 62, the inner piston head having a clutch surface 102 formed thereon and the outer piston skirt having a clutch surface 104 formed therein and mating with clutch surface 102 to provide a clutch 106. A seal 108 on inner piston head 98 seals the piston head relative to the inner surface of the outer piston skirt 62 adjacent to the clutch surface 102 so that the clutch surfaces and the chamber 110 between the inner and outer piston heads 68 and 98 are not exposed to hydraulic pressure in chamber 100. A passage 112 provides an inlet to chamber 100 which is connected with brake line 34. An inner pressure chamber 114, defined by the inner portion of piston 86 and cylinder end wall 56, is connected by passage 116 to brake line 32. Passage 118 is connected with chamber 100 at its uppermost point to provide for bleeding entrapped air.

In the preferred construction illustrated in the drawing, the outer piston has an effective area in the pressure actuating chamber 100 which is less than the effective area of the inner piston in chamber 114. As discussed in the above example, the outer piston may have one third of the total effective area and the inner piston two thirds of the total effective area.

The inner surface of inner piston skirt 90 has splines 120 formed thereon and providing a reciprocal mounting arrangement for adjuster nut 122. This nut has exterior splines 124 mating with the piston splines 120 to prevent rotation of the nut relative to the piston. A spring seat 126 is held in place in piston skirt 90 by a retainer 128 and a compression spring 130 acts on spring seat 126 and the head of adjuster nut 122 to urge that nut toward inner piston head 98. Another compression spring 132 acts on spring seat 126 and cylinder end wall 56 to urge inner piston 86 toward outer piston head 68. Spring 132 is axially preloaded throughout the range of brake operation to exert an axial force on the inner piston which is less than the retractile force of seal 64 acting on the outer piston 60. The axial force of spring 132 also urges the inner piston clutch surface 102 into clutching engagement with the clutch surface 104 of outer piston 60.

A threaded shaft 134 is rotatably mounted in aperture 58 of the caliper housing, with the threaded end 136 extending into adjuster nut 122. Nut 122 is internally threaded for this purpose. Shaft 134 has a thrust member 138 thereon which engages end wall 56 to take reaction force at that point. It is also provided with a seal 140 which seals it at aperture 58. The outer end 142 of shaft 134 extends outwardly of the caliper housing and has a brake actuating lever 144 secured thereto so that the shaft may be rotated by suitable means such as a brake actuating cable. A resilient member 146 is positioned on shaft 134 between lever 144 and the caliper housing to provide a cover for aperture 58 and also to keep the shaft from moving axially and rattling.

In a typical installation such as that shown in FIG. 1, the partial system brake effectiveness is improved by the use of two pressure chambers in each of the front wheel cylinders. The two chambers may be divided in such a manner that the effective piston area of one piston is two thirds of the total front piston area and the other piston area is one third of the total front piston area. The chambers having the pistons with one third of the total area are also connected to the rear brakes. With the two brake circuits being connected to separate pressurizing chambers of the master cylinder, the system will sustain fifty percent of the total braking when only one of the two hydraulic circuits is operative. Other piston area proportions may be used with different system connections to provide a greater braking effort with single circuit operation than is available when only one pressure chamber is used at each wheel.

The parking brake mechanism employed has a high mechanical advantage between the parking brake handle or pedal operated by the vehicle driver and the lever 144. For this reason, and also to minimize brake pedal travel, the clearance between the brake linings 74 and 82 and the disc friction surfaces 76 and 84 is kept at a minimum. A mechanical mechanism that compensates for lining wear is therefore incorporated in the caliper assembly. The threaded portion of shaft 134 and the cooperating threads of adjuster nut 122 have a high lead. At the rest position and during hydraulic brake actuation, shaft 134 is stationary. When hydraulic pressure is applied in pressure chambers 100 and 114 the outer piston 60 is moved toward disc 22. Due to the force of compression spring 130, similar movement of the inner piston 86 is prevented at this point. If there is sufficient disc-to-lining clearance the outer piston will move sufficiently to separate the two pistons at their clutch surfaces 102 and 104. The hydraulic force acting on inner piston 86 and transmitted through spring seat 126 and spring 130 to adjuster nut 122 urges the adjuster nut toward disc 22. Since the clutch 106 is no longer engaged and therefore no longer resists rotation of the inner piston 86, nut 122 will rotate on shaft 134 as it moves toward the disc, rotating piston 86 and extending the nut relative to the shaft threaded end 136. When the forward motion of outer piston 60 stops, the inner piston 86 will engage its clutch surface 102 with the outer piston clutch surface 104, causing the inner piston rotation to stop. A slight axial clearance between the threads of nut 122 and shaft threaded end 136 will allow a slight return movement of the inner and outer pistons and the adjuster nut to provide the minimal lining clearance relative to the disc when the brakes are released. Compression spring 130 is designed to deflect at a predetermined brake apply pressure exerted in chamber 114 so as to prevent over adjustment caused by caliper deflection at higher braking pressures. When the pressure in chamber 114 exceeds the designed spring deflecting pressure, inner piston 86 engages the outer piston 60 at clutch 106 to prevent further turning of the adjuster nut and the inner piston, thereby limiting adjustment at higher pressures.

When the brake is applied manually, such as for parking purposes, lever 144 is rotated in a direction which causes adjuster nut 122 to be moved axially toward disc 22. This occurs since the adjuster nut is locked against rotation by the engagement of clutch 106, and both the inner and outer pistons are moved toward disc 22 to clamp the brake linings against the disc friction surfaces.

What is claimed is:

1. A disc brake caliper assembly comprising:
   a housing having a stepped cylinder formed therein with first and second stepped chambers defined by a first cylinder wall, a second cylinder wall of smaller diameter than said first cylinder wall and joined thereto by a shoulder, and an end wall;
   first and second brake pressure supply passages respectively connecting with said first and second stepped chambers of said cylinder;
   a cup-shaped first piston reciprocably and sealingly received in said first stepped chamber and opening toward said second chamber, said first piston having a head, a skirt section with a first clutch surface and a cylinder wall formed therein, and means on the head thereof non-rotatably mounting a brake pad assembly;
   a cup-shaped second piston reciprocably and rotatably and sealingly received in said second stepped chamber and said first piston cylinder wall and opening toward said end wall, said second piston having a head with a second clutch surface thereon cooperating with said first piston first clutch surface to define a clutch and a skirt section with an axial force transmitting surface therein;

an adjuster nut non-rotatably received in said second piston skirt section and axially movable therein and having an axial force transmitting surface thereon engageable with said second piston axial force transmitting surface;

a threaded shaft received in said second chamber and mounted in said base wall and having said adjuster nut threaded thereon for combined rotary and axial movement; and pre-loaded spring means having a first section acting on said second piston and said end wall and said adjuster nut and a second section acting on said end wall, said first section urging said second piston away from said end wall and said clutch into engagement and said second section urging said adjuster nut toward axial engagement with said second piston at said axial force transmitting surfaces;

said first and second cylinder walls and said shoulder and said first and second pistons cooperating to define a first pressure actuating chamber, and said second cylinder wall and said end wall and said second piston cooperating to define a second pressure actuating chamber fluidly separated from said first pressure actuating chamber, said first and second pressure actuating chambers respectively being fluid connected with said first and second brake pressure supply passages, said first piston having an effective area in said first pressure actuating chamber which is less than the effective area of said second piston in said second pressure actuating chamber;

said first piston moving in the brake apply direction upon pressurization of said first pressure actuating chamber and said second piston moving in the brake apply direction upon sufficient pressurization of said second pressure actuating chamber to overcome said spring means acting between said second piston and said adjuster nut, said clutch preventing rotary movement of said second piston and said adjuster nut and therefore preventing axial movement of said adjuster nut until the forces holding said clutch surface in clutching engagement are decreased by first piston movement in the brake apply direction, and said adjuster nut and said second piston then rotating and moving axially to reengage said clutch surfaces in non-slipping clutching relation, thereby adjusting said brake caliper.

2. A disc brake actuating and adjusting mechanism comprising:

a housing having a cylinder formed therein defined by side and end walls and an end opening, a first recessed piston reciprocably received in said cylinder at said end opening and having a piston-retracting seal sealing between said first piston and said cylinder side wall and exacting a retractile force on said first piston, a second recessed piston rotatably and reciprocably received in said cylinder and in a cylinder found in said first piston and sealingly engaging the side walls of said cylinders, a clutch having a surface thereof formed on each of said pistons and engageable to prevent rotation of said second piston relative to said first piston, a shaft mounted against substantial axial movement in said cylinder end wall and having a high-lead threaded portion extending axially of said cylinder into said second piston, an adjuster nut threaded on said shaft for concurrent rotary and axial movement and nonrotatably received in said second piston in axially movable relation, axially engageable axial force transmitting surfaces formed on said second piston and said adjuster nut, a preloaded first spring acting between said adjuster nut and said second piston urging said axial force transmitting surfaces toward engagement, and a second spring compressibly extending between said cylinder end wall and said second piston and axially preloaded throughout the range of operation of said second piston to exert an axial force thereon less than the retractile force of said first piston seal and urging said second piston clutch surface into clutching engagement with said first piston clutch surface, said mechanism actuating a brake by pressure acting on at least one of said pistons.

3. The mechanism of claim 2, said shaft being rotatable to move said adjuster nut axially to exert brake actuating force axially through said second piston to said first piston independently of pressure acting on either of said pistons.

* * * * *